Oct. 25, 1966    R. R. COUNCILMAN ET AL    3,280,698
ROTATING SPOTTER FOR PLOTTING PROJECTORS
Filed Aug. 28, 1964    3 Sheets-Sheet 1

ARMAND J. SOUCY
WALTER E. THIELE
RICHARD R. COUNCILMAN
INVENTORS

BY *Glenn H. Antrim*
AGENT

RICHARD R. COUNCILMAN
ARMAND J. SOUCY
WALTER E. THIELE
INVENTORS

United States Patent Office 3,280,698
Patented Oct. 25, 1966

3,280,698
ROTATING SPOTTER FOR PLOTTING PROJECTORS
Richard R. Councilman and Armond J. Soucy, Garland, and Walter E. Thiele, Irving, Tex., assignors to Ling-Temco-Vought, Inc., Dallas, Tex., a corporation of Delaware
Filed Aug. 28, 1964, Ser. No. 392,752
7 Claims. (Cl. 88—24)

This invention pertains to spotting projectors and line cursors, and particularly pertains to spotting projectors that provide a selection of different marks that are to be imposed simultaneously on points that are being plotted for different curves.

The spotting projector of this invention is particularly applicable to systems that use data plotting and indicating devices similar to those described in U.S. Patent 2,859,659 issued to D. M. Fenske et al. on November 11, 1958. As shown in the accompanying FIG. 1, a system may comprise a plurality of plotting projectors 11 and 12. Each of these plotters 11 and 12 is represented schematically by essential components. For example, according to the teaching of the patent referenced above, signal for X-axis data is applied to input 15 and signal for Y-axis data is applied to input 16. The X-axis data is converted to horizontal motion, the Y-axis data is converted to vertical motion, and the resultant of both of these motions is applied to a marking stylus 17. The stylus 17 is moved to inscribe a transparent line upon an opaque slide 18. The transparent line is projected by usual optical means as line 19 upon the screen 20. The slide 18 that is being marked while line 19 is being projected provides a permanent record. Likewise, the plotting projector 12 responds to the application of X-axis signal and Y-axis signal to the inputs 21 and 22 to inscribe a transparent line and project it as line 23 upon the screen 20.

In addition to a plurality of plotting projectors, a system may include one or more spotting projectors as represented by the spotting projector 24 of FIG. 1. The spotting projector displays any selected pattern on the screen 20 to mark a particular curve or to show the relative positions of curves that are being plotted simultaneously on the screen. Assume that the lines 19 and 23 represent respective moving vehicles. The data that are applied to inputs 15 and 16 may be received from one location where one object is being observed to provide data for plotting the curve 19, and the data that are applied to inputs 21 and 22 may be received from another location to provide data for plotting the curve 23. The spotting projector 24 may, for example, project an image 43 of an aircraft. Still another projector that is not shown may project a circular reference scale 25 with concentric circles of known radii about the point that is just being plotted by the plotting projector 12.

The spotting projector 24 that is shown schematically in FIG. 1 has a rotatable disc 26 with a plurality of transparent images through its face on a particular circumference. Through rotation of the disc 26, any selected one of the images is placed in a beam of light for projection onto the screen 20. The selected image is also positioned according to X-Y coordinates. In FIG. 1, the X-axis and Y-axis inputs 21 and 22 control both the plotting projector 12 and the spotting projector 24. Therefore, the disc 26 is translated in a path such that the selected image is superimposed on that portion of the curve 23 that is just being plotted by the stylus of the plotting projector 12. Whereas, in the plotting projector 11 or 12, the stylus 17 is attached to a frame that is moved in a path that is the resultant of the motion produced by X-axis data and the motion produced by Y-axis data; in the spotting projector, the image disc 26 is attached to a similar frame and when the X-Y inputs of a spotting projector is connected in parallel with the inputs of a plotting projector. The respective stylus and spotting image are moved in unison.

When a spotting image is to be changed, a signal is applied to the input 27 of the spotting projector 24. This input is coupled through a parallel-crank, four-bar coupler 28. The coupler is supported by a pivoted linkage that is mounted between the stationary frame of the projector and the image disc 26 or its X-Y frame. The disc 26 is rotated a desired amount in response to application of signal to the input 27 to select a desired image, but it is stationary with respect to the X-Y frame as the frame itself is moved in response to application of signals to inputs 21 and 22.

A cursor or distance and course projector 29 is shown in FIG. 2 in conjunction with plotting projectors 30 and 31. In comparison with the spotting projector, the cursor has an additional rotating disc that also may be translated according to the resultant of X-motion and Y-motion. Two discs 32 and 33 are mounted closely adjacent and independently rotatable on the X-Y frame of the cursor 29. The disc 32 has a cut-out or transparent window for projecting a straight line. The disc 33 is an opaque mask with a cutout in the shape of a spiral of Archimedes. Assume that the plotting projector 30 is plotting the line 34 on the screen 37 to track a vehicle and that the plotting projector 31 is plotting the line 35 to track another vehicle. The discs 32 and 33 of the cursor 29 move along an X-axis and a Y-axis in unison with the stylus of the plotting projector 31 so that the starting end of a line or cursor 36 falls on line 35 at the point of a moving vehicle that is just being plotted. A signal is applied to an input 38 to cause rotation of the disc 32 until the direction of the cursor 36 is oriented in the direction of the vehicle that is being tracked by the line 34 from a vehicle that is being tracked by the line 35. Another signal is applied to an input 39 to cause rotation of the disc 33 that has the transparent figure in the shape of a spiral of Archimedes. The length of the cursor 36 and therefore the distance between the vehicles is determined by the signal that is applied to the input 39 relative to that applied to the input 38. Obviously, the cursor 36 may be rotated while its length is varied as desired by applying appropriate signals to inputs 38 and 39 simultaneously. The window of disc 32 may be merely a transparent line scribed on an opaque slide, the slide being inserted in a holder about an opening in the disc 32. Also, concentric circles of known radii may be scribed about the starting point of the line to provide a reference scale similar to the scale 25 of FIG. 1.

Accordingly, this invention comprises in a projector a spotting disc that is rotatably coupled to a plotting frame that is movable in a direction that is the resultant of motion in the direction of an X-axis and in the direction of a Y-axis, a rotary input for rotating the spotting disc for changing images that are to be projected, and a parallel-crank, four-bar linkage coupled between the rotary input and the rotatable spotting disc to rotate the spotting disc to change spotting images, and the rotation of the spotting disc being independent of its X or Y translation that results from the movement of the plotting frame. The cursor has an additional rotatable disc so that two separate inputs are connected through adjacent parallel-crank, four-bar linkages respectively to respective adjacent rotatable discs that are rotatably coupled to an X-Y coordinate frame.

An object of this invention is to provide a spotting projector that operates faster than prior spotters to superimpose a selected image on a line that is being plotted rapidly.

Another object is to retain accuracy in a spotting projector that can follow plotting rapidly and provides quick change in selection of spotting images.

And still another object is to provide a cursor that operates rapidly to project a measuring line that is positioned relative to lines that are being plotted.

Other objects and advantages will be apparent from the specification and claims and from the accompanying drawing illustrative of the invention in which:

Figure 3:
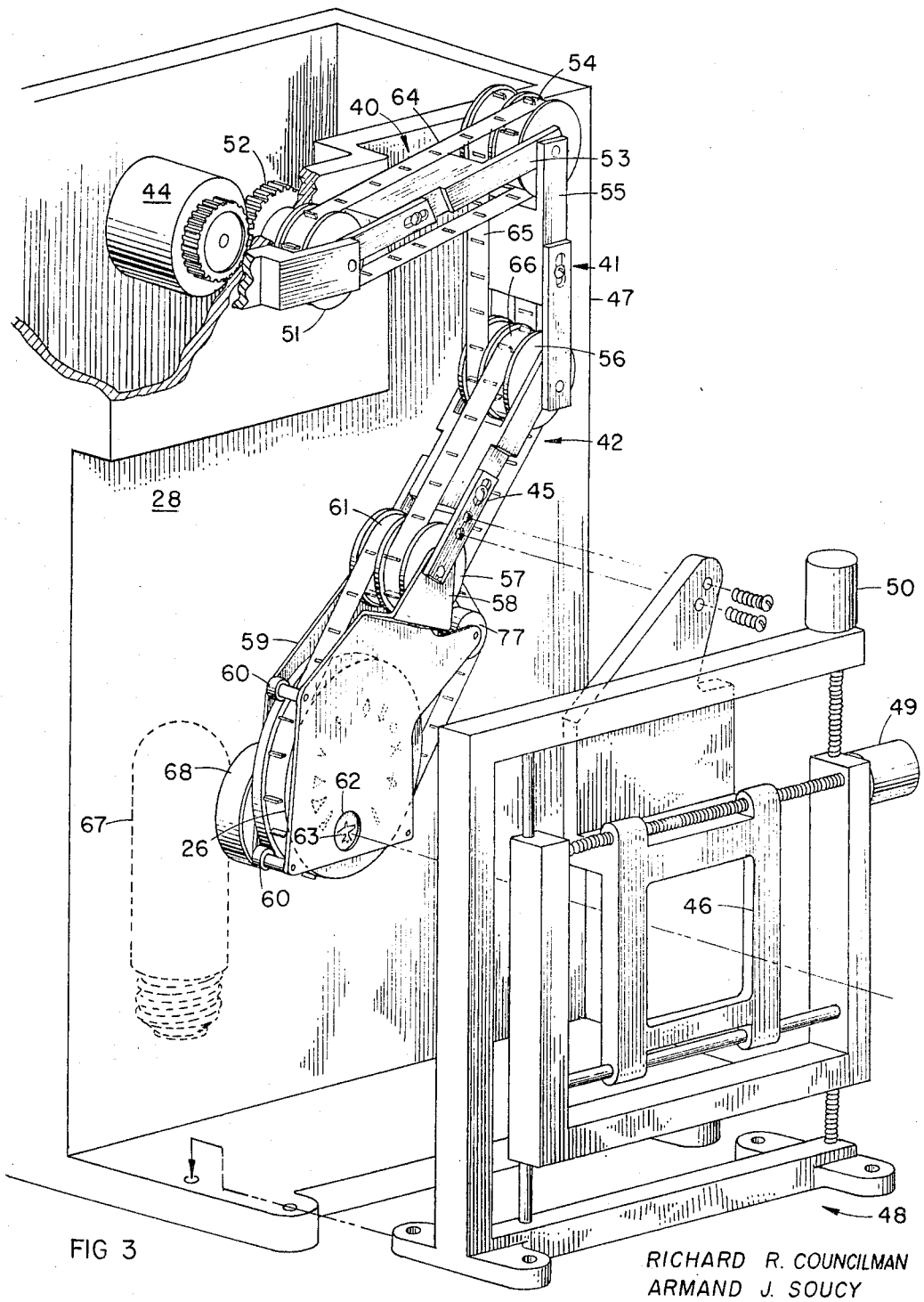
FIG. 3 is a front oblique perspective view of the spotting apparatus of a spotting projector.

With reference to FIG. 3, a parallel-crank, four-bar assembly 28 for rotating a spotting image disc 26 comprises the links 40, 41, and 42. The disc 26 is rotatively positioned according to the positioning of a driving motor 44 (servo motor) controlled by reference inputs. The bar 45 is rigidly attached to a follower frame 46 that maintains the link 42 precisely oriented in a fixed direction relative to a main frame 47. For clarity, the follower frame 46 of an X–Y coordinate translating assembly 48 is shown removed from the main frame 47 and brought forward. A servo motor 49 moves the follower frame 46 and the attached image disc 26 in the direction of an X-axis, and a servo motor 50 moves the frame and disc in the direction of a Y-axis.

In detail, the servo motor 44 is mounted to the main frame 47 and is rotatably coupled to a sprocket 51 through a gear 52. The gear 52 and sprocket 51 are rotatably mounted on the main frame 47 of the spotter as shown or on the stationary portion of the coordinate frame 48. The sprocket 51 is the input to the pivoted parallel-crank four-bar system that comprises the links 40 and 41 that can be rotated in any direction in a plane parallel to the X–Y plane of the follower frame 46. The bar 53 of the link 40 has one end pivoted on the axes of the sprocket 51 and the other end pivotally joined at the axis of a dual sprocket 54 to end of the bar 55, and the other end of the bar 55 is pivotally joined to the bar 45 that is maintained in a fixed direction. A dual sprocket 56 is rotatably mounted on that axis upon which the bars 45 and 55 are rotatably joined. A dual sprocket 57 is rotatably mounted to the lower end of the bar 45, and also a pair of spaced parallel image disc mounting plates 58 and 59 are rigidly fastened to the lower end of the bar 45. The sprockets are fabricated namely from aluminum because of its low mass. A preferred sprocket wheel has three concentric laminated discs. The center disc is fabricated from hardened stainless steel and has accurately spaced sprocket teeth projecting radially therefrom. The outside discs are fabricated from aluminum. The cylindrical surfaces of the outside discs are hardened by anodizing to resist wear that may be caused by contact with the belt so that the diameter of the sprocket is maintained accurately.

The image disc 26 is rotatably mounted between the plates 58 and 59 by three or more cylindrical mounting rollers 60 that are rotatably mounted between the plates so that their cylindrical surfaces bear against the periphery of the image disc 26. The diameter of one end of each roller is smaller than that end portion that bears directly against the image disc 26, to provide clearance for the belt 61 that engages the periphery of the disc. The mounting plate 58 has an opening 62 and the opposite mounting plate 59 has a similarly placed opening through which a projection beam is directed to project an image 63 that is transparent through the face of the image disc 26. Other images are placed on that circumference of the image disc 26 on which image 63 is located and through which the projection beam is directed.

Belts with openings for sprocket teeth couple together sprockets of the parallel crank system. The belts are fabricated from hardened stainless steel. Belts of .002 inch thickness provide good strength, high durability, and low mass. The spockets 51, 54, 56, and 57 are precisely the same diameter where they engage their belts so that all rotative motion between the sprocket 51 and the sprocket 57 caused by translation of the follower frame 46, is canceled. The belt 64 couples sprockets 51 and 54; the belt 65 couples the sprockets 54 and 56; the belt 66 couples the sprockets 56 and 57; and the belt 61 couples the sprocket 57 to the image disc 26. Since the arms 45 and the plate 58 are rigidly attached to the frame 46, the ratio of coupling between the sprocket 61 and the image disc is not related to the canceling of rotation by the parallel-crank, four-bar system. A ratio of 2:1 for this coupling has been found convenient to use. An idler pulley 91 is rotatably mounted to the frame 58 for tightening the belt 61 and to spread it so that it encompasses only about one-half of the circumference of the image disc 26. Often the link 42 that is fixed in direction is not required. The link 41 can be pivotally joined to the disc mounting plates 58 and 59 and the plates 58 and 59 can be rigidly fastened to the follower frame 46. The image disc 26 is then rotatably coupled to the output sprocket of the link 41. The elimination of the link 42 and its sprocket 57 decreases mass to aid rapid operation.

A projection lamp 67 and a collimating lens 68 supply a projection beam. The beam passes through the image 63, the opening 62, a window of the follower frame 46, and focusing lens that are shown schematically as lens 69 in FIG. 1, to a remote screen. As described above with reference to FIG. 1, the follower frame 46 is moved in unison with a similar follower frame of a plotting projector to project the image 63 upon a point being plotted by the plotting projector. The translation of the follower frame 46 does not cause rotation of the image disc 26. The projected spotting image may be changed quickly by operation of the positioning device 44 that operates through the parallel-crank linkage 28 to rotate the image disc 26.

Figure 4:
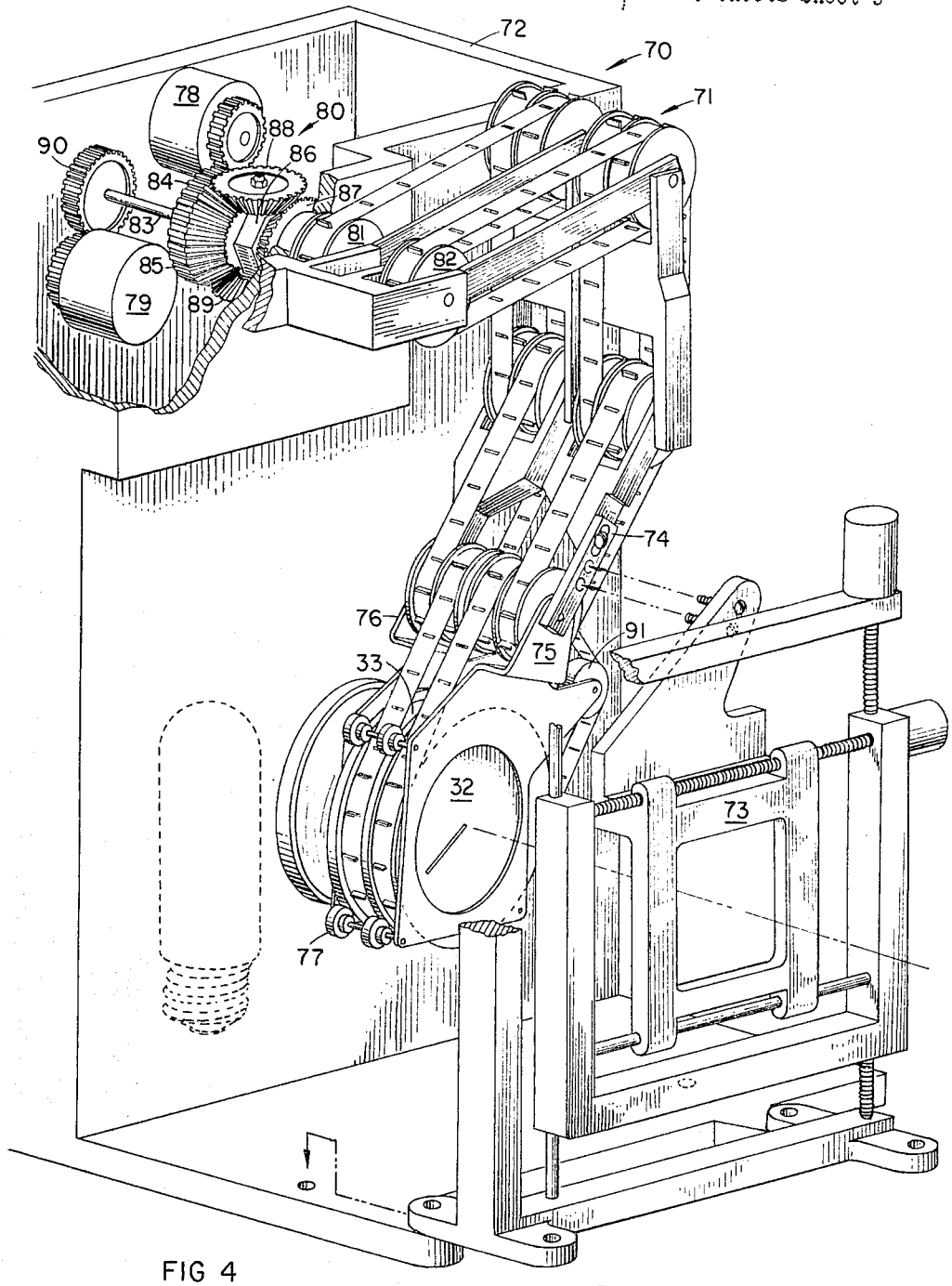
FIG. 4 is a front oblique perspective view of the cursor of a projector.

In FIG. 4, two image discs 32 and 33 are mounted adjacently to provide, as described above, a cursor that travels with an image that is being projected by a plotting projector. The rotatable output of a parallel-crank, four-bar linkage 70 is coupled to the image disc 33 and a similar linkage 71 is coupled to the image disc 32. Each of these linkages is similar to the linkage 28 that is shown in FIG. 3. The end of the bars at the input of the linkages 70 and 71 are adjacent and are pivotally joined to the stationary frame 72. Also, in an arrangement that is similar to that shown in FIG. 3, the bar 74 to which the disc mounting plates 75 and 76 are rigidly attached, is rigidly attached to the follower frame 73. However, the mounting plates 75 and 76 are spaced to accommodate the mounting of the additional image disc between them. A plurality of mounting roller assemblies 77 are mounted between the mounting plates 75 and 76 about the circumference of the discs 32 and 33. Each assembly 77 has a respective independently rotatable roller to bear against periphery of each one of the discs 32 and 33.

Servo motor means 78 and 79 are coupled through a differential gear system 80 to input sprockets 81 and 82 of the parallel-crank linkages 70 and 71 respectively. The motor 79 is coupled through a gear 90 to a drive shaft 83 on which are concentrically and successively mounted a spur drive gear 84, a bevel gear 85, a planetary or spider gear arm 86, a bevel gear 87, the input sprocket 81, and the input sprocket 82. The arm 86 and the input sprocket 82 of the parallel-crank linkage 71 are fastened to rotate with the shaft 83, but the input sprocket 81 of the linkage 70 and the gears 84, 85, and 87 are free to rotate on the shaft. The spur gear 84 engages the output gear of the motor 78 and is fastened to the bevel gear 85 so that the bevel gear 85 is constrained to rotate only according to the rotation of the shaft of the motor 78. Planetary bevel gears 88 and 89 are mounted on opposite ends of the arm 86 and engage both the bevel gears 85 and 87 in a conventional arrangement. The input sprocket 81 of the linkage 70 is constrained to rotate with the bevel gear 87.

The disc 32, that has the image of a line, is rotated in response to operation of the motor 79 to determine the direction of a projected line. The motor 79 also operates through the differential gear system 80 to rotate the adjacent disc 33 in unison with the disc 32. Therefore, as the direction of the projected line is changed, its length may be maintained constant as the position of the spiral mask of the disc 32 is not changed relative to the line of the disc 33. When desired, both motors 78 and 79 may be operated simultaneously to change the length of the projected line while changing its direction. When only the motor 78 is operated, the disc 33 alone is rotated to change the length of the projected line.

In detail, the operation of the motor 78 alone causes rotation of the spur gear 84 and the attached bevel gear 85. Since the planetary gear arm 86 is being held stationary by the motor 79, the planetary gears 88 and 89 function as idler gears to transfer the rotation of the bevel gear 85 to the bevel gear 87 and the attached input sprocket 81. The rotary motion of the input sprocket 81 is transmitted through the parallel-crank linkage 70 to the disc 33 that has the spiral shaped opening.

The operation of the motor 79 alone causes rotation of the shaft 83 and the input sprocket 82 that is rigidly attached to the shaft. The rotation of the input sprocket 82 is transmitted through the parallel-crank linkage 71 to the image disc 32 to rotate the projected line. While the shaft 83 is being driven to rotate the line, the arm 86 is being rotated to revolve the planetary gears 88 and 89 that are engaged with the bevel gear 85. The resulting rotation of the planetary gears is imparted to the bevel gear 87 and the adjacent input sprocket 81 to rotate the image disc 33 in the same direction and at the same rate as the direction and the rate of the rotation of the image disc 32. The length of the line is therefore maintained constant while it is changed in direction. Obviously, the direction and length of the line may be changed simultaneously by the simultaneous operation of both motors 78 and 79. The relative rotation of the two image discs 32 and 33 is then a function of the differential rotation between the input that is applied to the shaft 83 and the input that is applied to the bevel gear 85.

Figure 1:
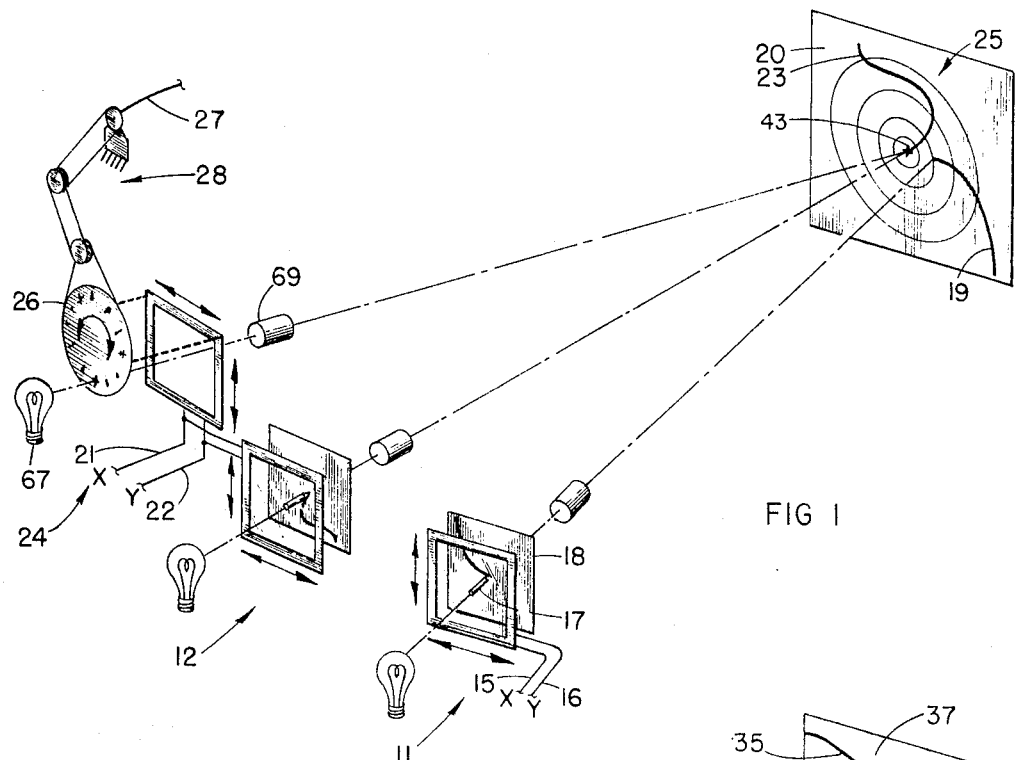
FIG. 1 is a simplified schematic illustration to show the operation of a spotting projector.
Figure 2:
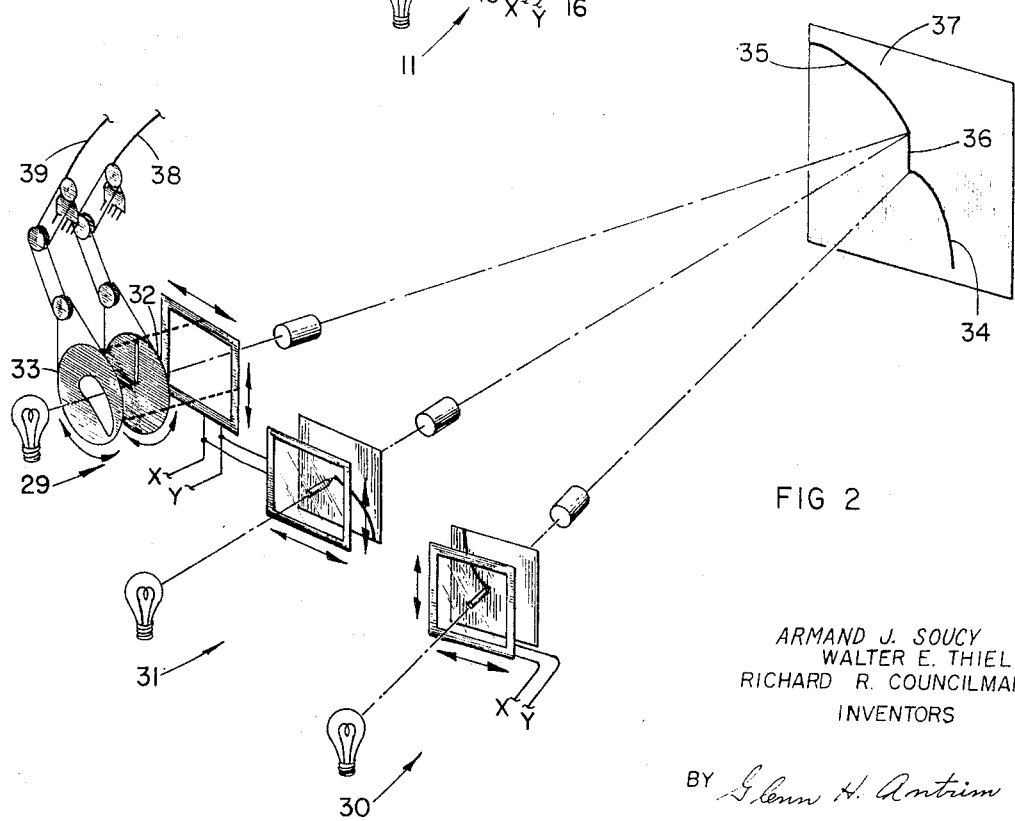
FIG. 2 is a simplified schematic illustration to show the operation of a cursor.

The spotting projector and the line cursor of this invention are especially advantageous for use with mechanical plotting projectors that operate rapidly. Coordinate plotting frames that are somewhat more complicated than that shown as assembly 48 in FIG. 1 provide a minimum mass to be moved by either of the motors for the X-input and the Y-input. Substantially the same arrangement that moves a stylus in the fast operating plotters can be utilized to move the spotting disc in an X–Y plane. The spotting disc assembly and the parallel-crank, four-bar linkage can be quite thin so as to require a minimum space within the plane in which they are located. The effective mass of the image disc and the linkage to which it is coupled is small enough to permit fast operation. In spite of the fast operation, high accuracy in the positioning of the projected images is attained.

While certain embodiments of the invention have been described in detail herein and shown in the accompanying drawing, it will be evident that various modifications are possible in the arrangement and construction of its components without departing from the scope of the invention.

I claim:

1. In a projector having a stationary frame, a follower frame, and means for controlling the position of said follower frame in accordance with signals corresponding to coordinates,
    a spotting disc having different marking images through its face, said spotting disc being rotatably mounted on said follower frame,
    a parallel-crank four-bar linkage having an input end pivotally joined to said stationary frame, an output end fixedly joined to said follower frame, a rotatable input, and a rotatable output, said rotatable output being coupled to said rotatable input,
    rotative positioning means coupled to said rotatable input of said linkage, and
    means for rotatably coupling said rotatable output of said linkage to said spotting disc.

2. In a projector having a stationary frame, a follower frame, and means for controlling the positioning of said follower frame in accordance with signals corresponding to coordinates,
    a spotting disc having different marking images through its face, said spotting disc being rotatably mounted on said follower frame,
    a parallel-crank, four-bar linkage comprising a plurality of supporting bars pivotally joined, a rotatable sprocket assembly at each junction of said bars, and a plurality of belts adapted to fit in a non-slip manner on said sprockets,
    one end of said linkage being pivotally joined to said stationary frame, an input sprocket being rotatably mounted to that end of said linkage that is joined to said stationary frame,
    the other end of said linkage being fixedly joined to said follower frame and having a dual output sprocket rotatably mounted thereto,
    said sprockets at opposite ends of each of said bars being coupled by at least one of said belts, said spotting disc having a sprocket, said output sprocket being coupled through one of said belts to said sprocket of said spotting disc,
    and rotative controlled positioning means rotatively coupled to said input sprocket to rotate said spotting disc for positioning a selected one of said images in a projection beam.

3. In a projector having a stationary frame, a follower frame, and means for controlling the position of said follower frame in a plane in accordance with signals corresponding to coordinates,
    first and second image discs mounted on said follower frame with their faces adjacent for independent rotation of the discs about an axis perpendicular to their faces, each of said discs having a transparent window,
    means for projecting the overlapping portions of said windows onto a screen,
    first and second linkages for transmitting rotary motion, each of said linkages being capable of transmitting motion from a fixed point to any point within a predetermined area in a plane,
    said linkages each having a rotatable input end attached to said stationory frame and an output end attached to said follower frame,
    first and second rotative positioning means, said first rotative positioning means being coupled to the rotatable input of said linkage and said second rotative positioning means being coupled to the rotatable input of said second linkage,
    means for rotatably coupling the output of said first linkage to said first image disc and means for rotatably coupling the output of said second linkage to said second image disc,
    said first and second rotative means being operable individually to rotate said respective image discs at different velocities, thereby, to change the shape of said projected overlapping images, and
    said first rotative means being operable to rotate said discs in unison to change the orientation of said projected overlapping images.

4. In a projector as claimed in claim 3, in which said window of said first image disc is a narrow linear window for projecting a line and said window of said second image disc has a spiral outline, said first rotative means being operable to rotate a line projected from the image of said first disc, and said second rotative means being operable to determine the length of said projected line.

5. In a projector having a stationary frame, a follower frame, and means for controlling the position of said follower frame in accordance with signals corresponding to coordinates,
- first and second image discs mounted on said follower frame with their faces adjacent for independent rotation of the discs about an axis perpendicular to their faces, each of said discs having a transparent window,
- means for projecting the overlapping portions of said windows onto a screen,
- first and second parallel-crank, four-bar linkages, each of said linkages having an input end pivotally joined to said stationary frame, an output end fixedly joined to said follower frame, a rotatable input, and a rotatable output, said rotatable output being coupled to said rotatable input,
- first and second rotative positioning means, said first rotative positioning means being coupled to said rotatable input of said first linkage and said second rotative positioning means being coupled to said rotatable input of said second linkage,
- means for rotatably coupling output of said first linkage to said first image disc and means for rotatably coupling said output of said second linkage to said second image disc,
- said first and second rotative means being operable individually to rotate said respective image discs at different velocities, thereby, to change the shape of said projected overlapping images, and
- said first rotative means being operable to rotate said discs in unison to change the orientation of said projected overlapping images.

6. In a projector having a stationary frame, a follower frame, and means for controlling the positioning of said follower frame in accordance with signals corresponding to coordinates,
- first and second image discs mounted on said follower frame with their faces adjacent for independent rotation of the discs about an axis perpendicular to their faces, said first disc having an opening with a spiral outline through its face, said second disc having a narrow linear opening through its face, means for projecting the overlapping portions of said openings onto a screen,
- first and second parallel-crank, four-bar linkages, each of said linkages having an input end pivotally joined to said stationary frame, an output and fixedly joined to said follower frame, a rotatable input, and a rotatable output, said rotatable output being rotatably coupled to said rotatable input,
- a differential gear system having first and second control inputs and first and second rotative control outputs, said first control input and said second control input being differentially coupled through said first control output to said input of said first linkage, the output of said first linkage being rotatably coupled to said first image disc,
- said second control input being coupled to said second control output, said second control output being coupled to said input of said second linkage, and
- the output of said second linkage being rotatably coupled to said second image disc.

7. In a projector having a stationary frame, a follower frame, and means for controlling the position of said follower frame in a plane in accordance with signals corresponding to coordinates,
- first and second image discs mounted on said follower frame with their faces adjacent, each of said discs having an opaque portion and a transparent window, said discs being mounted transverse the projection beam of said projector for projecting overlapping portions of said windows onto a screen, said first disc being rotatably mounted for changing orientation of its window in said beam, and said second disc being adjustable to change the amount of overlap of said windows,
- first and second flexible drive means, each one for transmitting control motion from a respective fixed point on said stationary frame to a respective one of said image discs independent of the position of said follower frame,
- first and second motive control means, said first motive control means being connected through said first flexible drive means to said first image disc, said second motive control means being connected through said second flexible drive means to said second image disc,
- said first motive means being operable to change orientation of the window of said first image disc transverse said projection beam, and
- said second motive means being operable to change the amount that the window of said second image disc overlaps the window of said first image disc.

References Cited by the Examiner
UNITED STATES PATENTS

| | | | |
|---|---|---|---|
| 2,421,077 | 5/1947 | Miller | 88—24 |
| 2,584,267 | 2/1952 | Hayek | 88—24 |
| 2,859,659 | 11/1958 | Fenske et al. | 88—24 |
| 3,132,558 | 5/1964 | Wymann | 88—24 |
| 3,160,462 | 12/1964 | Angst et al. | 346—29 |
| 3,195,402 | 7/1965 | Hamilton | 88—24 |

NORTON ANSHER, *Primary Examiner.*

V. A. SMITH, *Assistant Examiner.*